(12) United States Patent
Hartmann

(10) Patent No.: US 7,690,037 B1
(45) Date of Patent: Mar. 30, 2010

(54) FILTERING TRAINING DATA FOR MACHINE LEARNING

(75) Inventor: Alfred C. Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 1105 days.

(21) Appl. No.: 11/181,221

(22) Filed: Jul. 13, 2005

(51) Int. Cl.
*G06F 11/00* (2006.01)

(52) U.S. Cl. ............... 726/23; 726/22; 726/24; 726/25

(58) Field of Classification Search ......... 707/6; 726/22–25
See application file for complete search history.

(56) References Cited

U.S. PATENT DOCUMENTS

| | | | |
|---|---|---|---|
| 4,959,849 A | 9/1990 | Bhusri | |
| 5,331,550 A * | 7/1994 | Stafford et al. | 382/128 |
| 5,355,474 A | 10/1994 | Thuraisngham et al. | |
| 5,584,024 A | 12/1996 | Shwartz | |
| 5,664,172 A | 9/1997 | Antoshenkov | |
| 5,742,806 A | 4/1998 | Reiner et al. | |
| 5,826,076 A | 10/1998 | Bradley et al. | |
| 6,088,803 A | 7/2000 | Tso et al. | |
| 6,108,699 A * | 8/2000 | Moiin | 709/221 |
| 6,128,740 A | 10/2000 | Curry et al. | |
| 6,192,483 B1 * | 2/2001 | Moiin et al. | 714/4 |
| 6,311,278 B1 | 10/2001 | Raanan et al. | |
| 6,314,409 B2 | 11/2001 | Schneck et al. | |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,775,657 B1 | 8/2004 | Baker | |
| 6,775,827 B1 | 8/2004 | Harkins | |
| 6,839,850 B1 | 1/2005 | Campbell et al. | |
| 6,928,553 B2 | 8/2005 | Xiong et al. | |
| 7,085,780 B2 * | 8/2006 | Sakamoto et al. | |
| 7,085,928 B1 | 8/2006 | Schmid et al. | |

(Continued)

FOREIGN PATENT DOCUMENTS

WO       WO 01/71499 A1       9/2001

OTHER PUBLICATIONS

AirCERT web page, last updated Sep. 18, 2000 [online]. Cert.org [retrieved Apr. 18, 2003]. Retrieved from the Internet<URL:http://www.cert.org/kb/aircert/>.

(Continued)

*Primary Examiner*—Nasser Moazzami
*Assistant Examiner*—Mohammad W Reza
(74) *Attorney, Agent, or Firm*—Fenwick & West LLP

(57) ABSTRACT

Data center activity traces form a corpus used for machine learning. The data in the corpus are putatively normal but may be tainted with latent anomalies. There is a statistical likelihood that the corpus represents predominately legitimate activity, and this likelihood is exploited to allow for a targeted examination of only the data representing possible anomalous activity. The corpus is separated into clusters having members with like features. The clusters having the fewest members are identified, as these clusters represent potential anomalous activities. These clusters are evaluated to determine whether they represent actual anomalous activities. The data from the clusters representing actual anomalous activities are excluded from the corpus. As a result, the machine learning is more effective and the trained system provides better performance, since latent anomalies are not mistaken for normal activity.

10 Claims, 5 Drawing Sheets

U.S. PATENT DOCUMENTS

| | | | |
|---|---|---|---|
| 7,120,645 | B2 | 10/2006 | Manikutty et al. |
| 7,120,933 | B2 | 10/2006 | Mattsson |
| 7,185,232 | B1 | 2/2007 | Leavy et al. |
| 7,237,265 | B2 | 6/2007 | Reshef et al. |
| 7,389,324 | B2 * | 6/2008 | Masonis et al. ............ 709/206 |
| 2002/0065896 | A1 | 5/2002 | Burakoff et al. |
| 2002/0083343 | A1 | 6/2002 | Crosbie et al. |
| 2002/0087882 | A1 | 7/2002 | Schneider et al. |
| 2002/0157020 | A1 | 10/2002 | Royer |
| 2003/0037251 | A1 | 2/2003 | Frieder et al. |
| 2003/0051026 | A1 | 3/2003 | Carter et al. |
| 2003/0069880 | A1 | 4/2003 | Harrison et al. |
| 2003/0101355 | A1 | 5/2003 | Mattsson |
| 2003/0133554 | A1 | 7/2003 | Nykanen et al. |
| 2003/0145226 | A1 | 7/2003 | Bruton et al. |
| 2003/0154402 | A1 | 8/2003 | Pandit et al. |
| 2003/0167229 | A1 | 9/2003 | Ludwig et al. |
| 2003/0188189 | A1 | 10/2003 | Desai et al. |
| 2003/0204719 | A1 | 10/2003 | Ben-Itzhak |
| 2003/0221123 | A1 | 11/2003 | Beavers |
| 2004/0098617 | A1 | 5/2004 | Sekar |
| 2004/0098623 | A1 | 5/2004 | Scheidell |
| 2004/0193656 | A1 | 9/2004 | Pizzo et al. |
| 2004/0199535 | A1 | 10/2004 | Zuk |
| 2004/0205360 | A1 | 10/2004 | Norton et al. |
| 2004/0220915 | A1 | 11/2004 | Kline et al. |
| 2004/0250127 | A1 | 12/2004 | Scoredos et al. |
| 2004/0250134 | A1 | 12/2004 | Kohler et al. |
| 2004/0260945 | A1 | 12/2004 | Raikar et al. |
| 2005/0086529 | A1 | 4/2005 | Buchsbaum |
| 2005/0097149 | A1 | 5/2005 | Vaitzblit et al. |
| 2005/0108384 | A1 * | 5/2005 | Lambert et al. ............ 709/224 |
| 2005/0138006 | A1 | 6/2005 | Bennett et al. |
| 2005/0138426 | A1 | 6/2005 | Styslinger |
| 2005/0154733 | A1 | 7/2005 | Meltzer et al. |
| 2005/0203886 | A1 | 9/2005 | Wong |
| 2005/0203921 | A1 | 9/2005 | Newman et al. |
| 2005/0210027 | A1 * | 9/2005 | Aggarwal et al. |
| 2005/0273859 | A1 | 12/2005 | Chess et al. |
| 2005/0289187 | A1 | 12/2005 | Wong et al. |
| 2006/0070128 | A1 | 3/2006 | Heimerdinger et al. |
| 2006/0117386 | A1 | 6/2006 | Gupta et al. |
| 2006/0212438 | A1 | 9/2006 | Ng |
| 2006/0212941 | A1 | 9/2006 | Bronnikov et al. |
| 2006/0242136 | A1 | 10/2006 | Hammond et al. |
| 2007/0074188 | A1 | 3/2007 | Huang et al. |
| 2007/0094728 | A1 | 4/2007 | Julisch et al. |
| 2007/0169194 | A1 | 7/2007 | Church et al. |
| 2007/0258256 | A1 * | 11/2007 | Richard et al. .............. 362/492 |

OTHER PUBLICATIONS

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (Acid), indicating release date of Sep. 8, 2000 [online]. Andrew.cmu.edu [retrieved Apr. 18, 2003]. Retrieved from the Internet<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP" [online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet<URL:http:/nsc.cz/index/php?language=en&menuitem=0&subitem=4&subitem=13>, 3 pages, Czech Republic.

Parkhouse, Jayne, "Pelican Save TNet 2.0," [online] Jun. 2000, SC Magazine Product Review, [retrieved Dec. 1, 2003] Retrieved from the Internet <URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce, Managed Security Monitoring: Network Security for the 21$^{st}$ Century, 2001 [online]. Conterpane.com [retrieved Apr. 18, 2003]. Retrieved from the Internet<URL:http://www.counterpane.com/msm.pdf>.

SCIP Product, Microdasys—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet<URL:http://slashdot.org/article.pl?sid=00/11/27/1957238&mode=thread>.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups/google.com/groups?selm=8vm48v%245pd%241%40nnrp1.deja.com&oe=UTF-8&output=gplain>.

Webwasher AG/Full feature set, "Full feature set," [online]. Retrieved on Mar. 18, 2005. Retrieved from the Internet<URL:http://www.webwasher.com/enterprise/products/webwasher_products/ssl_scanner/full_feature set..html?l...>, 2 pages.

Webwasher AG/Webwasher Anti Spam, "Webwasher Anti Spam," [online]. Retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti_virus/index.html..>, 2 pages.

Webwasher AG/Webwasher Content Protection,"Webwasher Content Protection," [online]. Retrieved on Mar. 18, 2005. Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance," [online]. Retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Retrieved on Mar. 118, 2005. Retrieved from the Internet<URL:http://www.webwasher.com/enterprise/products/webwasher_products/ssl_scanner/index.html>, 2 pages.

Webwasher AG/Webwasher URL Filter, "Webwasher URL Filter," [online]. Retrieved on Mar. 18, 2005.
Retrieved from the Internet<URL:http://www.webwasher.com/enterprise/products/webwasher_products/webwasher_url_filter..>, 1 page.

Kruegel, C. et al., "Anomaly Detection of Web-Based Attacks," CCS'03, Oct. 27-31, 2003, ACM, pp. 251-261.

Chung, C.Y. et al., "DEMIDS: A Misuse Detection System For Database Systems," Department Of Computer Science, University Of California At Davis, Oct. 1, 1999, pp. 1-18.

Johnson R., Protecting Your Data and Your Microsoft SQL Server, Entercept Security Technologies, p. 1-12 [online], Oct. 2, 2002, [retrieved on Jan. 30, 2004]. Retrieved from the Internet:: <URL: http://networkassociates.com/us/tier2/products/media/mcatee/wp-sq/protection.pdf>.

KR Ügel, C. et al., "A Survey on Intrusion Detection Systems," Distributed Systems Group, Technical University Of Vienna, Dec. 12, 2000, pp. 1-36.

Lee, S.Y. et al., "Learning Fingerprints For A Database Intrusion Detection System," ESORICS 2002, LNCS 2502, pp. 264-279, Nov. 2002, Springer-Verlag, Germany.

Low, W.L. et al., "DIDAFIT: Detecting Intrusions In Databases Through Fingerprinting Transactions," ICEIS 2002—Databases And Information Systems Integration, 2002, pp. 121-128.

Ramasubramanian, P. et al., "Quickprop Neural Network Ensemble Forecasting Framework For A Database Intrusion Prediction System," Neiral Information Processing—Letters And Reviews, Oct. 2004, pp. 9-18, vol. 5, No. 1.

Solutions by Tech Target, Entercept Database Edition, Nov. 2002, [retrieved on Jan. 9, 2004]. Retrieved from the Internet: <URL: http//infosecuritymag.techtarget.com/2002/nov/solutions.shtml>.

Valeur, F. et al, "A Learning-Based Approach To The Detection Of SQL Attacks," Proceedings of the Conference on Detection of Intrusions and Malware & Vulnerability Assessment (DIMVA), Vienna, Austria, Jul. 2005, 18 pages.

Archive of "Postgre SQL 7.1 Documentation," www.postgresql.org, [online] [Archived by http://archive.org on Jun. 6, 2001; Retrieved May 2001] Retrieved from the Internet<URL: http://web.archive.org/web/20010606011227/www.postgresql.org/idocs/index.php?overv...>.

Halfond, G.J. et al., "Combining Static Analysis and Runtime Monitoring to Counter SQL-Injection Attacks," Workshop on Dynamic Analysis (WODA 2005), May 17, 2005, St. Louis, MO, USA, pp. 1-7.

Oracle, "Understanding Query Expressions," Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.

Pfleeger, Charles P., "Security in Computing," $2^{nd}$ edition, 1996, pp. 426-433.

Weisstein, E.W., "The CRC Concise Encyclopedia of Mathematics," 1998, p. 1726.

* cited by examiner

FILTERING TRAINING DATA FOR MACHINE LEARNING

BACKGROUND OF THE INVENTION

1. Field of the Invention

This invention pertains in general to computerized machine learning and in particular to generating training data for use in machine learning.

2. Description of the Related Art

Databases are widespread in modern computing environments. Companies and other enterprises rely on databases to store both public and private data. Many enterprises provide publicly-accessible interfaces to their databases. Malicious end-users can exploit the database interface to perform actions such as obtaining access to sensitive information. For example, in a Structured Query Language (SQL) injection attack the attacker sends the database a specially-crafted malicious query that can cause the database to reveal sensitive information or perform other malicious actions.

A database intrusion detection system (DIDS) attempts to detect malicious queries. Typically, the DIDS is trained to distinguish between legitimate and anomalous queries using machine learning techniques. Machine learning is useful for training DIDSs and other security systems where the complexity of the incoming traffic frustrates attempts at manual specification of legitimate and anomalous patterns. Machine learning also reduces classification errors such as false negatives or false positives.

Machine learning relies on training data, such as a set of training database queries, captured during data center operations. In traditional supervised machine learning, training data are marked as either legitimate or anomalous so the learning algorithm can correctly differentiate between the two types of activity. Where anomalous training sets are unavailable, as is often the case in security environments, the learning algorithm treats any significant deviation from the legitimate pattern as anomalous.

There is a strong assumption that any activity represented in the captured training data is indeed normal and therefore legitimate. This assumption presents substantial security risks if, in fact, the training data are unknowingly tainted with anomalous activity. As data center complexity grows and attacker sophistication evolves, it is increasingly likely that any significant trace of data center activity captured for use as training data will be tainted to some degree. These latent or covert abnormalities are effectively "grandfathered" into the training data, creating a security risk when the training data are used for detection.

Accordingly, there is a need in the art for a way to generate training data for machine learning that are less likely to contain data representing anomalous activities.

BRIEF SUMMARY OF THE INVENTION

The above need is met by exploiting a statistical likelihood that the training data represent predominately legitimate activity to allow for a targeted examination of only the data representing possible anomalous activity. Data center activity traces form a corpus used for machine learning. The data in the corpus are putatively normal but may be tainted with latent anomalies. The corpus is separated into clusters having members with like features. The clusters having the fewest members are identified, as these clusters represent potential anomalous activities due to the statistical likelihood that most of the training data in the corpus represents legitimate activity. The clusters having the fewest members are evaluated to determine whether they represent actual anomalous activities. The data from the clusters representing actual anomalous activities are excluded from the corpus. As a result, machine learning based on the corpus is more effective and the trained system provides better performance, since latent anomalies are not mistaken for normal activity.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
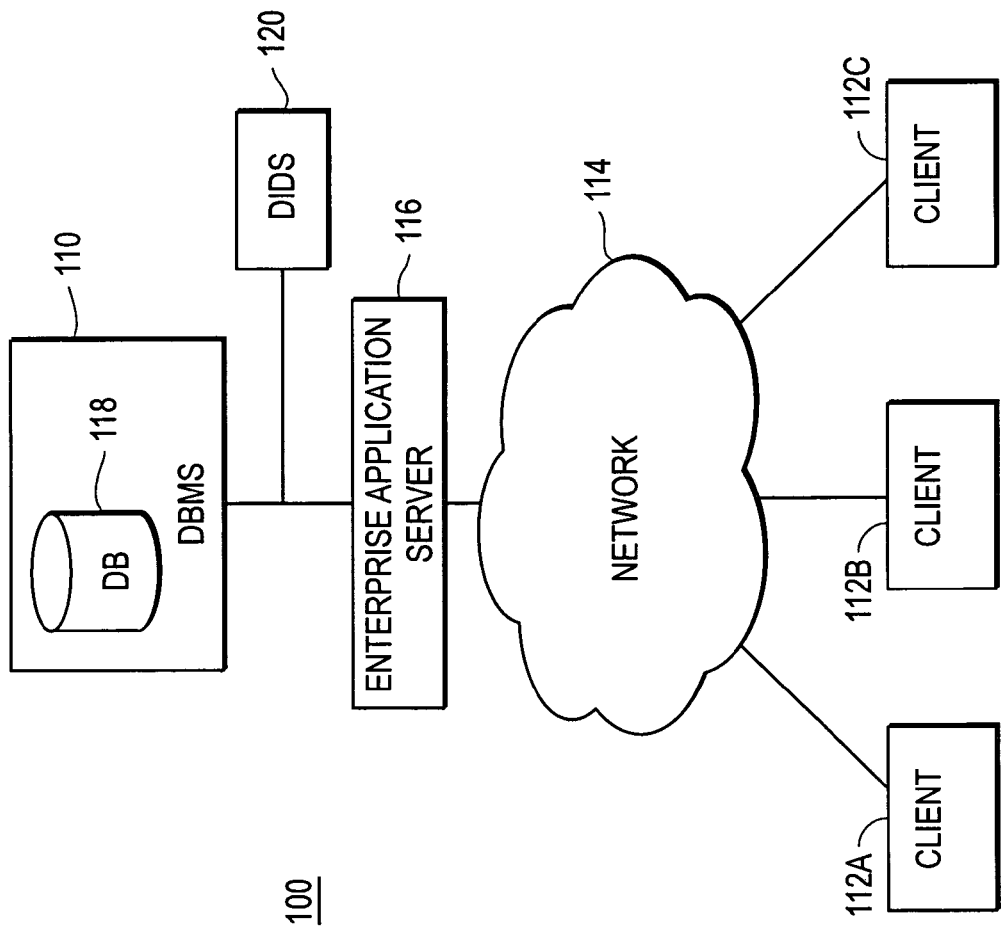
FIG. 1 is a high-level block diagram illustrating a view of a typical environment where it is desirable to generate training data for machine learning.

FIG. 1 is a high-level block diagram illustrating a view of a typical environment 100 where it is desirable to generate training data for machine learning. FIG. 1 specifically illustrates an environment 100 where machine learning is used to train a database intrusion detection system (DIDS) 120 to detect anomalous database queries. The illustrated environment 100 includes a database management system (DBMS) 110 in communication with multiple client computers 112 via a network 114. Only three client computers 112 are shown in FIG. 1 for purposes of clarity, but those of skill in the art will recognize that typical environments can have hundreds or thousands of client computers 112, and can also have multiple DBMSs 110. There can also be other computers connected to the network 114 beyond those shown in FIG. 1.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 enables data communication between and among the entities shown in FIG. 1 and in one embodiment is the Internet. In another embodiment, the network 114 is a local area network (LAN) or wide area network (WAN) operated by an enterprise and is not necessarily coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Internet Protocol security (IPsec), Secure HTTP and/or virtual private networks (VPNs). In another embodiment, the entities can use custom and/or dedicated data communications technologies instead of, or in addition to, the ones described above.

The DBMS 110 manages a database 118 that stores a collection of information. The information can include, for example, names, addresses, credit card numbers, products offered for sale, medical histories, social security numbers etc. Although the database 118 is shown within the DBMS 110, it can in fact be external and/or remote from the DBMS. Depending upon the embodiment, the DBMS 110 and/or database 118 can be centralized at one location or distributed over multiple locations. The DBMS 110 receives queries from the client computers 112 and provides data from the database 118 to the client computers in response.

An enterprise application server 116 is connected to the network 114 and executes an enterprise application that generates queries to the DBMS 110 based on actions performed by end-users of the clients 112 and/or passes along queries received from the clients. In one embodiment, the enterprise application server 116 executes a customer relationship management (CRM) application that enables an enterprise to manage its customer contacts using the database 118. There are a variety of other enterprise applications that the enterprise application server 116 can execute instead of, or in addition to, the CRM application. In one embodiment, the enterprise application server 116 is absent and the client computers 112 communicate directly with the DBMS 110.

The client computers 112 are utilized by end-users to interact with the enterprise application server 116 and the DBMS 110. In one embodiment, a client computer 112 is a typical personal computer such as an IBM-PC or Apple Macintosh compatible computer. In another embodiment, a client computer 112 is another type of electronic device, such as a cellular telephone, personal digital assistant (PDA), portable email device, etc.

In the illustrated environment 100, the DIDS 120 is connected to the network 114 between the enterprise application server 116 and the DBMS 110. The DIDS 120 can also be connected to other locations on the network 114 where it can monitor data passed between the DBMS 110 and the clients 112. In one embodiment, all or some of the functionality of the DIDS 120 is integrated into the DBMS 110 and/or enterprise application server 116.

The DIDS 120 monitors the upstream queries sent to the DBMS 110 and classifies the queries as "legitimate" or "anomalous." The DIDS 120 uses machine learning based on training data to classify the queries. The training data are filtered to exclude data representing anomalous activities, making it less likely that the training data include "grandfathered" anomalous behaviors.

Although this discussion focuses on using machine learning in the DIDS environment shown in FIG. 1, the techniques described herein can be used any environment where it is desirable to train a security system using data center traces. For example, in one embodiment the techniques are used to train a standard network intrusion/anomaly detection system to recognize an attack on a network or the failure of a component. The detection system is trained on a set of "normal" network traffic that includes instances of legitimate and anomalous activities. In other exemplary embodiments, the techniques are used for systems that perform application performance monitoring, user authentication, email filtering, or financial transaction monitoring.

Figure 2:
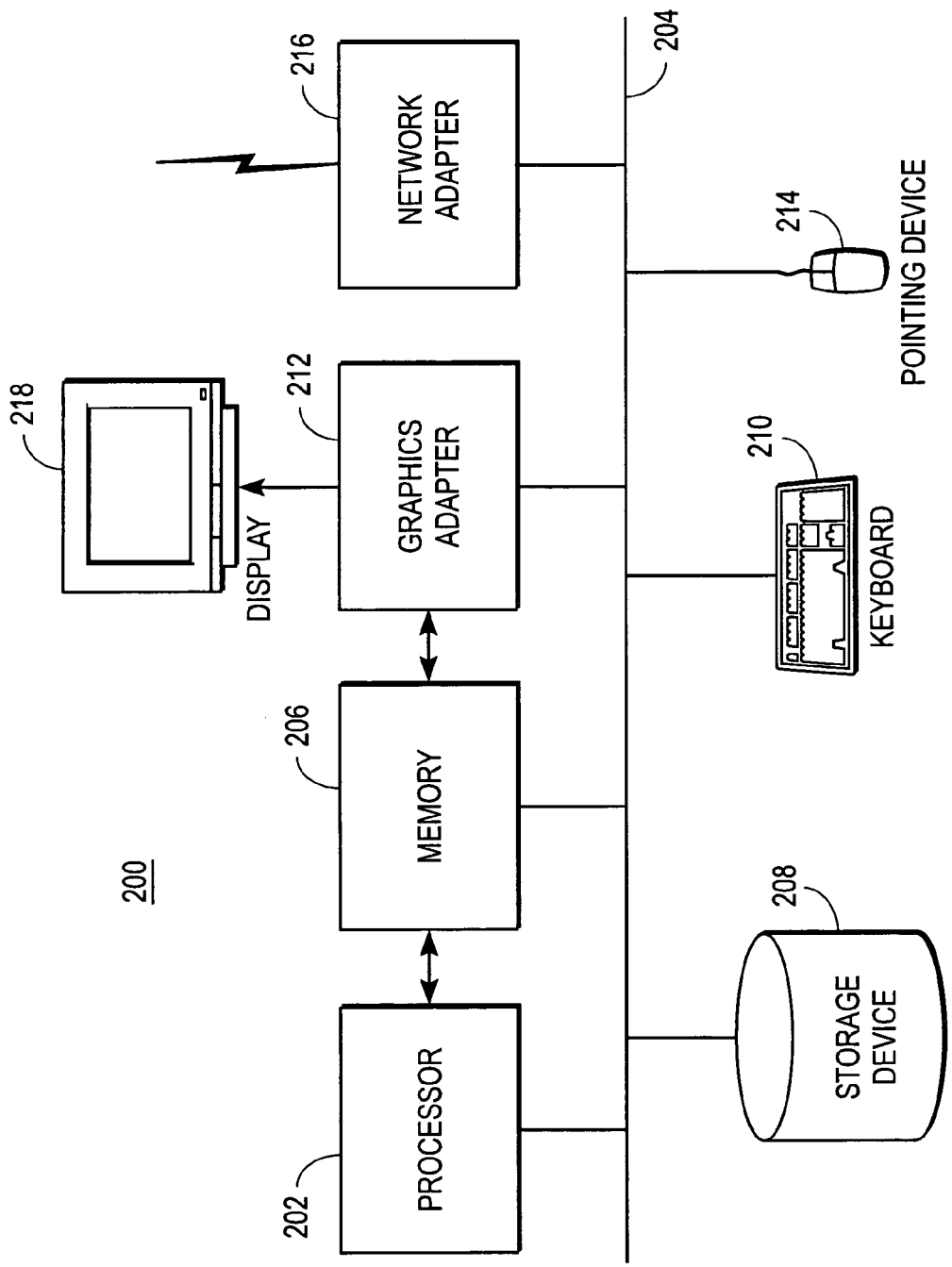
FIG. 2 is a high-level block diagram showing a computer system for acting as a DBMS, enterprise application server, DIDS and/or a client computer according to one embodiment.

FIG. 2 is a high-level block diagram showing a computer system 200 for acting as a DBMS 110, enterprise application server 116, DIDS 120 and/or a client computer 112 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. In one embodiment, the functionality of the bus 204 is provided by an interconnecting chipset. The bus 204 shown in FIG. 2 is an abstract representation of the interconnections provided by such a chipset. Computer systems acting in different roles may have different and/or additional elements than the ones shown in FIG. 2. For example, a computer system 200 acting as a DBMS 110 or web server 116 may have greater processing power and a larger storage device than a computer system acting as a client computer 112. Likewise, a computer system acting as a DBMS 110 or web server 116 server may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. The modules can be formed of executable computer program instructions recorded on a computer-readable storage medium such as storage device 208. When utilized, the modules are loaded into the memory 206 and executed by the processor 202.

Figure 3:
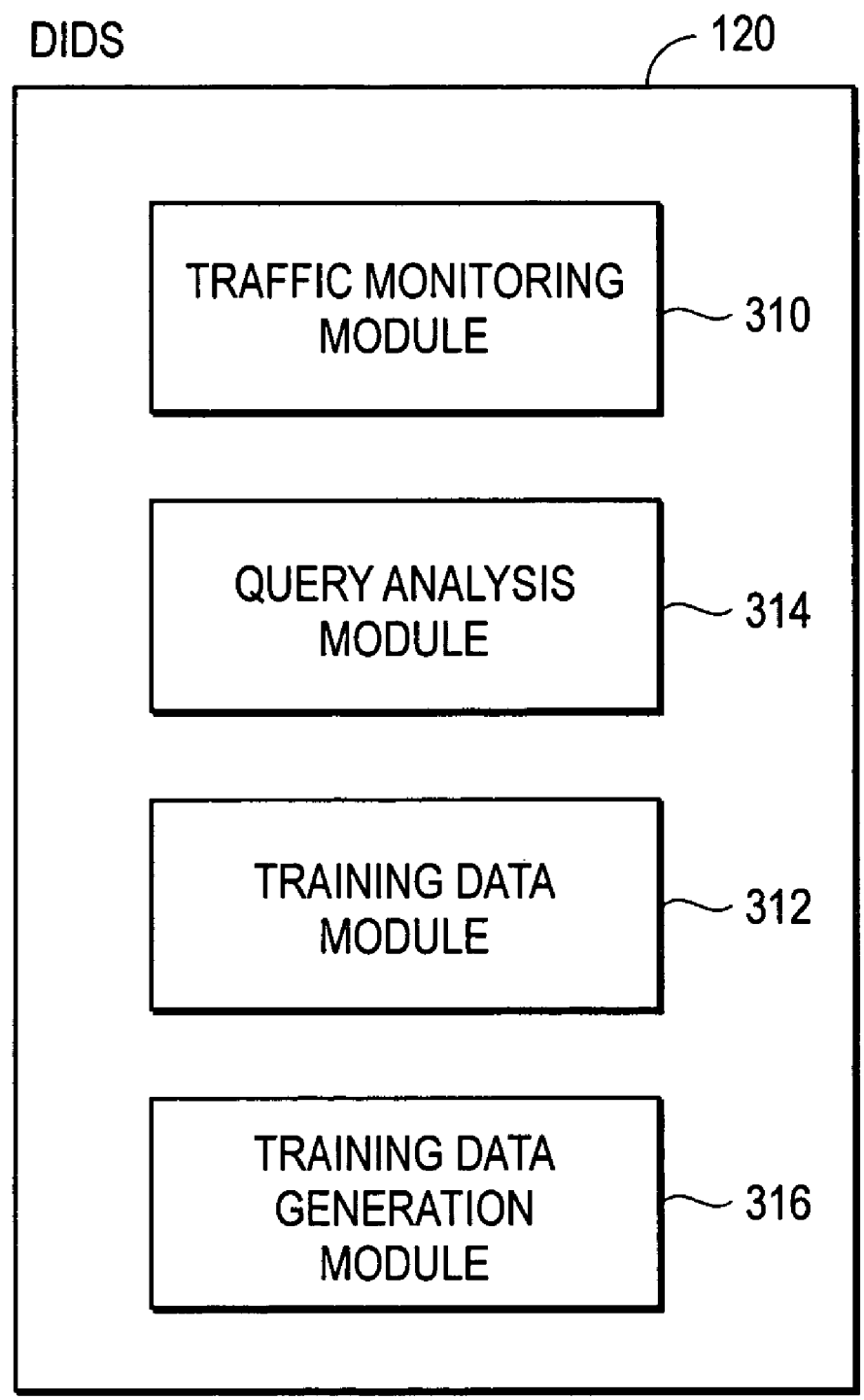
FIG. 3 is a high-level block diagram illustrating a more detailed view of the DIDS according to one embodiment.

FIG. 3 is a high-level block diagram illustrating a more detailed view of the DIDS 120 according to one embodiment. Those of skill in the art will recognize that other embodiments can have different and/or additional modules than those shown in FIG. 3. Likewise, the functionalities can be distributed among the modules in a manner different than described herein.

A traffic monitoring module 310 monitors data sent to the DBMS 110. These data include incoming (upstream) queries from the enterprise application server 116, client computers 112, and/or other entities on the network 114. In one embodiment, the queries are formulated in the Structured Query Language (SQL), but other embodiments can use other languages or techniques for representing the queries.

A training data module 312 holds training data that the DIDS 120 uses to classify an incoming query. The training data are generated through a machine learning process. In one embodiment, the training data module 312 includes a set of query templates that describe legitimate queries. In another embodiment, the training data module 312 includes data structures describing any associations between different database tables and fields made by the query and/or relationships between the fields of a table and the constraints that are applicable to the fields.

A query analysis module 314 examines the incoming queries and uses the training data to classify them as legitimate or anomalous. Queries that significantly deviate from the queries represented by the training data are classified as anomalous. In one embodiment, the query analysis module 314 determines whether an incoming query matches a query template in the training data 312. In another embodiment, the query analysis module 314 determines whether an incoming query exceeds the scope of the training queries as described by the training data.

In one embodiment, a training data generation module 316 generates the training data stored in the training data module 312. The training data generation module 316 receives queries monitored by the traffic monitoring module 310 during a training period and filters the queries to exclude those that are likely to represent anomalous activities. The training data generation module 316 transforms the remaining queries into the training data stored in the training data module 312.

Figure 4:
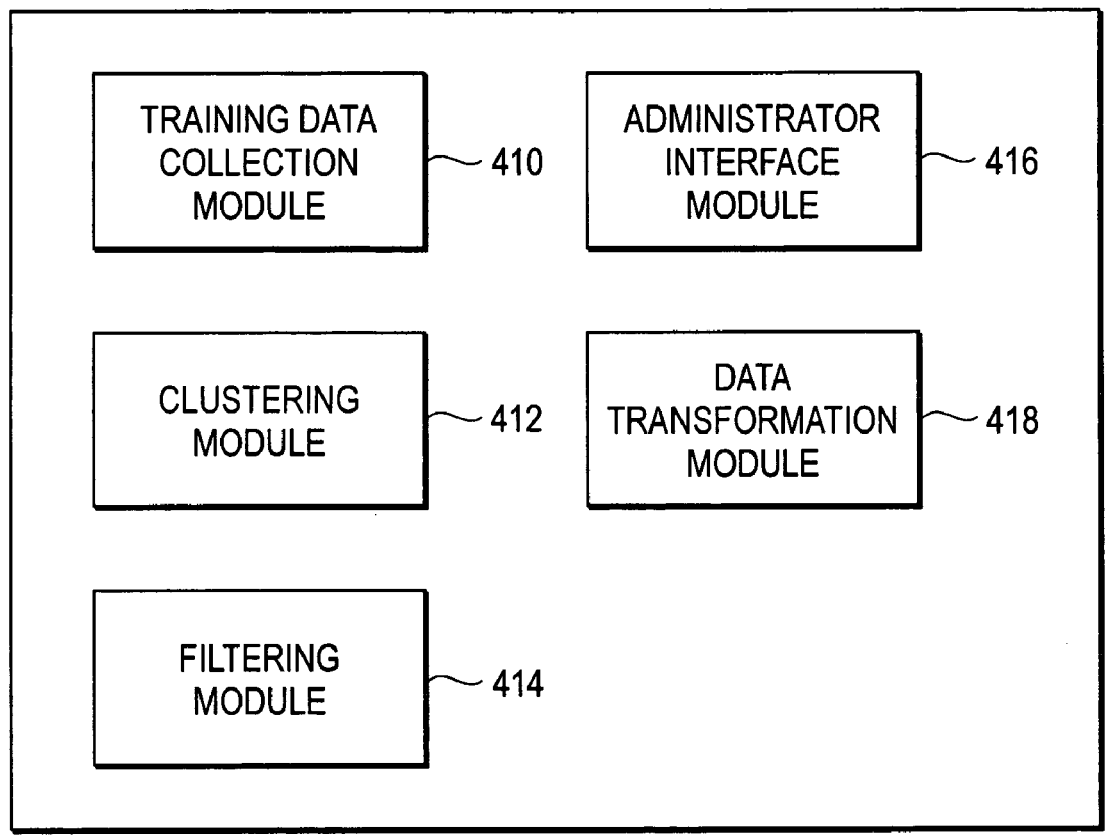
FIG. 4 is a high-level block diagram illustrating a more detailed view of the training data generation module according to one embodiment.

FIG. 4 is a high-level block diagram illustrating a more detailed view of the training data generation module 316 according to one embodiment. Those of skill in the art will recognize that other embodiments can have different and/or additional modules than those shown in FIG. 4. Likewise, the functionalities can be distributed among the modules in a manner different than described herein.

A training data collection module 410 receives the initial training data, also called the "corpus." The corpus is an activity trace from normal data center operations (i.e., the corpus is characterized as representative of normal data center activity). In the DIDS embodiment, the corpus includes the database queries received by the traffic monitoring module 310 during the training period. Since the corpus is generated from real-world activity, it is likely to include a large amount of legitimate activity and a lesser amount of anomalous (including malicious) activity.

A clustering module 412 receives the corpus and sorts the data contained therein into clusters having like features. In one embodiment, the clustering module 412 clusters based on features that are meaningful in distinguishing between legitimate and anomalous activity. In the DIDS embodiment where the training data include database queries, features on which the clustering module 412 may cluster include the: source (e.g., IP address) of the query; time or day the query was received; length of the query; structure and/or content of the query; results produced by the database 118 in response to the query; and/or other characteristics. Embodiments of the clustering module 412 use techniques such as Gaussian Mixture Models, K-Means, and/or Hierarchical clustering to generate the clusters. The number of clusters produced by the clustering module 412 depends upon the particular embodiment. Some clusters will have more members than others. The number of members of a cluster corresponds the frequency that activities having the features represented by the cluster occurred in the corpus.

A filtering module 414 filters the corpus to exclude members of clusters that represent anomalous activities. In one embodiment, the filtering module 414 sorts the clusters by number of members. This sorting will produce a range of clusters, where the clusters at one end of the range have relatively few members while the clusters at the other end have relatively many members. Due to the nature of the corpus, the clusters with the most members are more likely to represent legitimate activities while the clusters with very few members are more likely to represent anomalous activity.

The filtering module 414 filters the sorted clusters according to a filtering threshold. In general, the filtering threshold serves to distinguish between clusters that represent putatively legitimate (i.e., normal) activities and those that represent possible anomalous activities. In one embodiment, the filtering threshold specifies a number of clusters. For example, the threshold can be an integer such as "10" indicating that the 10 clusters having the fewest members are possibly anomalous. In another embodiment, the filtering threshold specifies the number of members of the cluster. For example, a threshold of "10" can indicate that all clusters having 10 or fewer members are possibly anomalous. In yet another embodiment, the filtering threshold specifies a time-based value such as one hour, indicating that all clusters that can be examined within an hour are treated as representing possibly anomalous activities. Other embodiments of the filtering module 414 utilize other thresholds in addition to, and/or instead of, the ones described here.

An administrator interface module 416 provides an interface that an administrator can utilize to review the clusters identified as possibly anomalous by the filtering module 414. In one embodiment, the administrator interface module 416 presents an interface on a display 218 that allows a person to manually score the clusters as either legitimate or anomalous. In some embodiments, the administrator interface module 416 enables other functionality such as allowing the administrator to analyze a member of a cluster by executing it to determine whether it performs an anomalous action. For example, in the DIDS embodiment, the administrator interface module 416 presents an interface that the administrator utilizes to review the clusters and the queries within the clusters. Additionally, the administrator can execute the database queries to determine whether they are anomalous. In one embodiment, the cluster analysis is performed by an automated process.

A typical end-result of the administrator's review is that some of the possibly-anomalous clusters are scored as legitimate while others are scored as anomalous. In one embodiment, the filtering module 414 removes the data representing activities scored as anomalous from the corpus. Depending upon the embodiment, the removed data can be discarded and/or added to another set of training data (e.g., to an anomalous set).

In one embodiment, a data transformation module 418 transforms the corpus remaining after the filtering into the training data stored in the training data module 312. For example, in one embodiment the data transformation module 418 converts database queries in the corpus into their canonical forms. In another embodiment, the data transformation module 418 populates data structures that describe any associations between different database tables and fields made by the query and/or relationships between the fields of a table and the constraints that are applicable to the fields.

The above description of the training data generation module 316 focuses on the generation of a "legitimate" training data. Those of skill in the art will recognize that the module 316 can be used in any context where the corpus is predominately of one type (e.g., legitimate) but contains some instances of another type (e.g., anomalous). For example, a corpus containing data representing predominately anomalous activities can be used to generate an anomalous training set.

Figure 5:
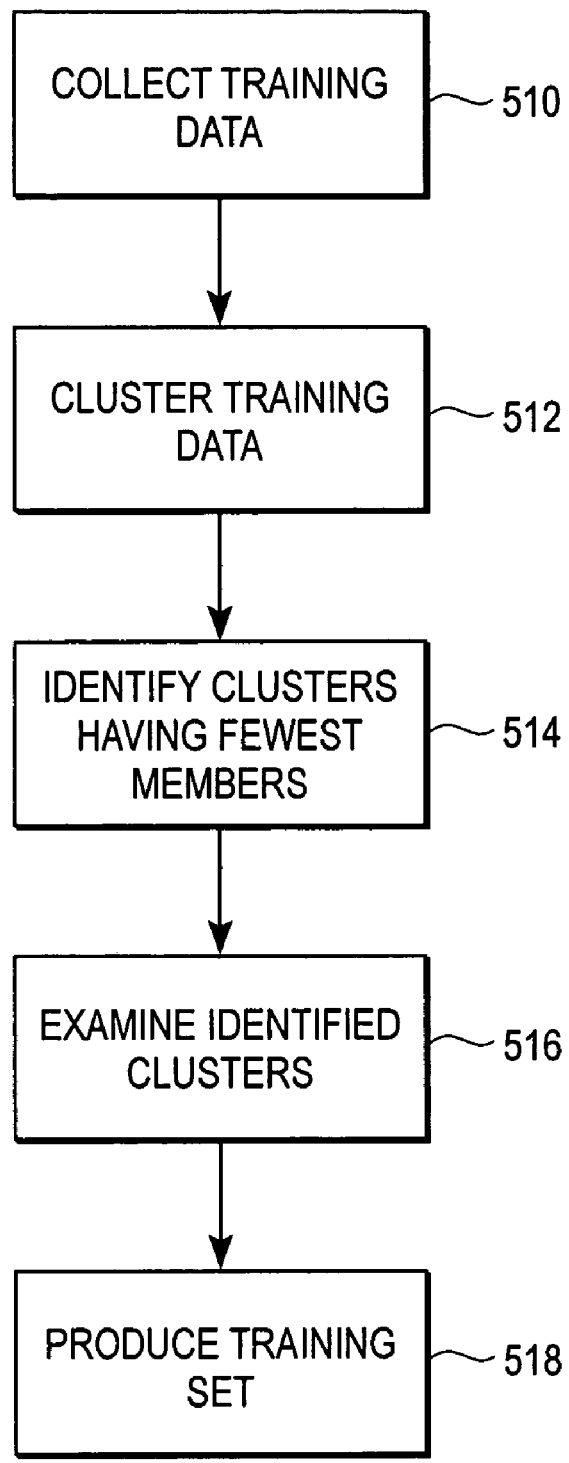
FIG. 5 is a flow chart illustrating steps performed by one embodiment of the training data generation module to generate a set of training data according to one embodiment.

FIG. 5 is a flow chart illustrating steps performed by one embodiment of the training data generation module 316 to generate training data. Those of skill in the art will recognize that other embodiments can perform different and/or additional steps. Moreover, other embodiments can perform the steps in different orders. Further, some or all of the steps can be performed by an entity other than the training data generation module 316.

The training data generation module 316 collects 510 the corpus by monitoring data center activities such as database queries received by a database 118 during a given time period. The corpus contains many instances of legitimate activity, and fewer instances of anomalous activity. The module 316 clusters 512 the data within the corpus to produce clusters of members having like features. The clusters having the fewest members are identified 514, as these clusters represent possible anomalous activities. An administrator examines 516 the identified clusters and evaluates whether they do, in fact, represent anomalous activities. The data representing actual anomalous activities are filtered from the corpus. If necessary, the training data generation module 316 produces 518 a set of training data by transforming the data remaining in the corpus.

The techniques described herein thus provide for machine learning on data center activity traces that are putatively normal but which may be tainted with latent anomalies. The techniques exploit statistical likelihood based on prior information that the normal training data represent predominately legitimate activity, and thus allow for targeted examination of only the data representing possible anomalous activity. As a result, the machine learning is more effective and the trained system provides better performance.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A method of generating a corpus for training a computerized security system, the security system for monitoring a data center to detect anomalous activity, comprising:
    collecting by a processor a corpus containing data describing data center activities;
    generating clusters from the corpus, each cluster containing data describing data center activities having like features and containing a number of members corresponding to a number of occurrences of the data center activities having like features in the corpus, wherein the clusters are based on one or more features selected from the set consisting of: a source of the data; a date or time of the data; a structure of the data; content of the data; and an output produced by the data center responsive to the data;
    identifying clusters possibly representing anomalous activities, wherein identifying the clusters comprises:
        ranking the clusters by number of members in the clusters; and
        applying a threshold to the ranked clusters, the threshold distinguishing between clusters possibly representing anomalous activities and clusters likely to represent legitimate activities;
    removing the data contained in the clusters possibly representing anomalous activities from the corpus; and
    transforming the corpus from which the data contained in the clusters possibly representing anomalous activities were removed into training data for the security system, the training data including a set of query templates to classify incoming queries, wherein the incoming queries are compared with the set of query templates in the security system.

2. The method of claim 1, wherein identifying the clusters further comprises:
    examining the clusters possibly representing anomalous activities to determine whether the clusters actually represent anomalous activities;
    wherein the data contained in the clusters actually representing anomalous activities are removed from the corpus.

3. The method of claim 1, wherein the data center includes a database, and wherein collecting a corpus comprises:
    collecting queries sent to the database.

4. A system for generating a corpus for training a security system to detect anomalous activity at a data center, comprising:
    a computer-readable storage medium having executable computer program instructions recorded thereon comprising:
        a data collection module adapted to collect a corpus containing data describing data center activities;
        a clustering module adapted to generate clusters from the corpus, each cluster containing data describing data center activities having like features and containing a number of members corresponding to a number of occurrences of the data center activities having like features in the corpus, the clustering module adapted to cluster based on one or more features selected from the set consisting of: a source of the data; a date or time of the data; a structure of the data; content of the data; and an output produced by the data center responsive to the data;
        a filtering module adapted to rank the clusters by number of members in the clusters, apply a threshold to the ranked clusters, the threshold distinguishing between clusters possibly representing anomalous activities and clusters likely to represent legitimate activities, and remove the data contained in the clusters possibly representing anomalous activities from the corpus; and
        a transformation module adapted to transform the corpus from which the data contained in the clusters possibly representing anomalous activities were removed into training data for the security system, the training data including a set of query templates to classify incoming queries, wherein the incoming queries are compared with the set of query templates in the security system; and
    a computer processor adapted to execute the computer program instructions recorded on the computer-readable storage medium.

5. The system of claim 4, further comprising:
    an interface module adapted to provide an interface for examining the clusters possibly representing anomalous activities to determine whether the clusters actually represent anomalous activities;
    wherein the filtering module is adapted to remove the data contained in the clusters actually representing anomalous activities from the corpus.

6. The system of claim 4, wherein the data center includes a database, and wherein the data collection module is further adapted to collect queries sent to the database.

7. A computer-readable storage medium having executable computer program instructions recorded thereon for generating a corpus for training a security system to detect anomalous activity at a data center, comprising:
    a data collection module adapted to collect a corpus containing data describing data center activities;
    a clustering module adapted to generate clusters from the corpus, each cluster containing data describing data center activities having like features and containing a number of members corresponding to a number of occurrences of the data center activities having like features in the corpus, the clustering module adapted to cluster the data based on one or more features selected from the set consisting of: a source of the data; a date or time of the data; a structure of the data; content of the data; and an output produced by the data center responsive to the data;

a filtering module adapted to rank the clusters by number of members in the clusters, apply a threshold to the ranked clusters, the threshold distinguishing between clusters possibly representing anomalous activities and clusters likely to represent legitimate activities, and remove the data contained in the clusters possibly representing anomalous activities from the corpus; and a transformation module adapted to transform the corpus from which the data contained in the clusters possibly representing anomalous activities were removed into training data for the security system, the training data including a set of query templates to classify incoming queries, wherein the incoming queries are compared with the set of Query templates in the security system.

8. The computer-readable medium of claim 7, further comprising:

an interface module adapted to provide an interface for examining the clusters possibly representing anomalous activities to determine whether the clusters actually represent anomalous activities;

wherein the filtering module is adapted to remove the data contained in the clusters actually representing anomalous activities from the corpus.

9. The computer-readable medium of claim 7, wherein the data center includes a database, and wherein the data collection module is further adapted to collect queries sent to the database.

10. A system for generating a corpus for training a security system to detect anomalous activity at a data center, comprising:

a computer-readable storage medium having executable computer program instructions recorded thereon comprising:

means for collecting a corpus containing data describing data center activities;

means for generating clusters from the corpus, each cluster containing data describing data center activities having like features and containing a number of members corresponding to a number of occurrences of that the data center activities having like features in the corpus, the means for generating clusters comprising means for clustering the data based on one or more features selected from the set consisting of: a source of the data; a date or time of the data; a structure of the data; content of the data; and an output produced by the data center responsive to the data;

means for ranking the clusters by number of members in the clusters, applying a threshold to the ranked clusters, the threshold distinguishing between clusters possibly representing anomalous activities and clusters likely to represent legitimate activities, and removing the data contained in the clusters possibly representing anomalous activities from the corpus; and means for transforming the corpus from which the data contained in the clusters possibly representing anomalous activities were removed into training data for the security system, the training data including a set of query templates to classify incoming queries, wherein the incoming queries are compared with the set of query templates in the security system.

\* \* \* \* \*